United States Patent [19]

Leotta

[11] Patent Number: 5,049,433

[45] Date of Patent: Sep. 17, 1991

[54] ARCHITECTURAL SAFETY GLASS

[75] Inventor: Frank R. Leotta, Nutley, N.J.

[73] Assignee: The Answer Corp., New Hyde Park, N.Y.

[21] Appl. No.: 525,199

[22] Filed: May 17, 1990

[51] Int. Cl.⁵ .............................................. B32B 9/00
[52] U.S. Cl. ................................ 428/195; 428/411.1; 428/426; 428/15; 428/40
[58] Field of Search .................... 428/195, 411.1, 426, 428/15, 40

[56] References Cited

U.S. PATENT DOCUMENTS

| 3,039,720 | 8/1977 | Cherenko et al. | 428/409 |
| 3,629,044 | 12/1971 | Sanger | 161/5 |
| 3,922,456 | 11/1975 | Baldridge | 428/38 |
| 4,035,549 | 7/1977 | Kennar | 428/409 |
| 4,173,672 | 11/1979 | Mannheim | 428/38 |
| 4,200,681 | 4/1980 | Hall et al. | 428/412 |
| 4,230,769 | 10/1980 | Goossens | 428/412 |
| 4,248,918 | 2/1981 | Hornibrook et al. | 428/40 |
| 4,341,683 | 7/1982 | Snelgrove | 428/437 |
| 4,663,228 | 5/1987 | Bolton et al. | 428/411.1 |
| 4,946,827 | 8/1990 | Harrison et al. | 428/195 |

Primary Examiner—Patrick J. Ryan
Assistant Examiner—Elizabeth Evans
Attorney, Agent, or Firm—Bernard Malina

[57] ABSTRACT

An architectural safety glass laminate is provided having a glass sheet, a plastic substrate, and therebetween an adhesive film. The substrate is provided with a decorative pattern on one surface thereof. An acrylic based substance is employed as the adhesive.

10 Claims, 1 Drawing Sheet

FIRST PASS — ADHESIVE TO GLASS

SECOND PASS — PLASTIC TO ADHESIVE/GLASS

ARCHITECTURAL SAFETY GLASS

BACKGROUND OF THE INVENTION

1. Field of the Invention

The invention concerns an architectural safety glass laminate provided with a decorative pattern.

2. The Related Art

A laminated glass has long been employed in both the automotive and construction industries. These laminates have generally been transparent for use as windshields or windows.

U.S. Pat. No. 4,200,681 (Hall et al) discloses a non-opaque polycarbonate article having improved mar, abrasion, scratch and solvent resistance. The article is formed from a polycarbonate substrate having deposited thereon an intermediate layer of photoreacted products derived of certain polyfunctional acrylic monomers. Onto the intermediate layer is vapor deposited a film of glass.

U.S. Pat. No. 4,230,769 (Goosens) reports a glass-polycarbonate resin laminate. Therein a glass layer is bonded to a polycarbonate resin layer by means of a three layered adhesive system involving different polyalkoxysilanes.

A further disclosure of reinforced glass structures is presented in U.S. Pat. No. 4,663,228 (Bolton et al). This patent teaches laminates formed of glass, ionomer resin and a polycarbonate sheet. The ionomer resin is described as an extrudable or cast substance comprising ionically cross-linked ethylene-methacrylic acid copolymers such as that available under the trademark "Surlyn" from the DuPont Company.

A number of patents describe safety glass structures provided with imprintations. Illustrative is U.S. Pat. No. 4,035,549 (Kennar) wherein glass is juxtaposed against a printed polyvinyl butyral (PVB) or a polyurethane layer. A technique is revealed in U.S. Pat. No. 4,341,683 (Snelgrove) for printing onto PVB sheets. See also U.S. Pat. No. 3,922,456 (Baldridge). In U.S. Pat. No. 4,173,672 (Mannheim), a laminate is decorated through thermo-impression and fixation of a PVB layer between two glass sheets.

In commerce there are available laminated glasses that have been provided with color. To secure color into the glass, an oven firing feature has usually been required. This procedure is expensive and only achieves solid colors. Attractive patterns such as marbling have heretofore not readily been achievable.

From the aforementioned patent art some progress has been made in providing decorative patterns but there still remains considerable room for improvement. Among problems found in the art is that printing interferes with adhesion of adjacent layers and the occurrence of bubble formations leading to delamination.

Accordingly, an object of the present invention is to provide an architectural sheet of shatterproof glass.

A further object of the present invention is to provide an architectural sheet of shatterproof glass imprinted with a decorative pattern.

A still further object of the present invention is to provide a laminated sheet of shatterproof glass whose layers are resistant to delamination even when imprinted with a decorative pattern.

SUMMARY OF THE INVENTION

An architectural safety glass laminate is provided comprising:
(i) a glass sheet;
(ii) an adhesive film; and
(iii) a plastic substrate provided with a decorative pattern on one surface thereof, the adhesive film positioned between and bonding the glass sheet to the plastic substrate.

Advantageously, the adhesive film is formed from an acrylic substance, especially an acrylic adhesive in the form of a double-sided tape or a liquid. Among the preferred plastic substrates are polyvinyl chloride (PVC), polycarbonate (PC), and polyethylene terephthalate (PET). Screen printing is the preferred method of providing the substrate with the decorative pattern.

BRIEF DESCRIPTION OF THE DRAWING

The above and other objects, features and advantages of the invention will become more readily apparent from the following description, reference being made to the drawing which includes.

DETAILED DESCRIPTION

Figures 1, 2:
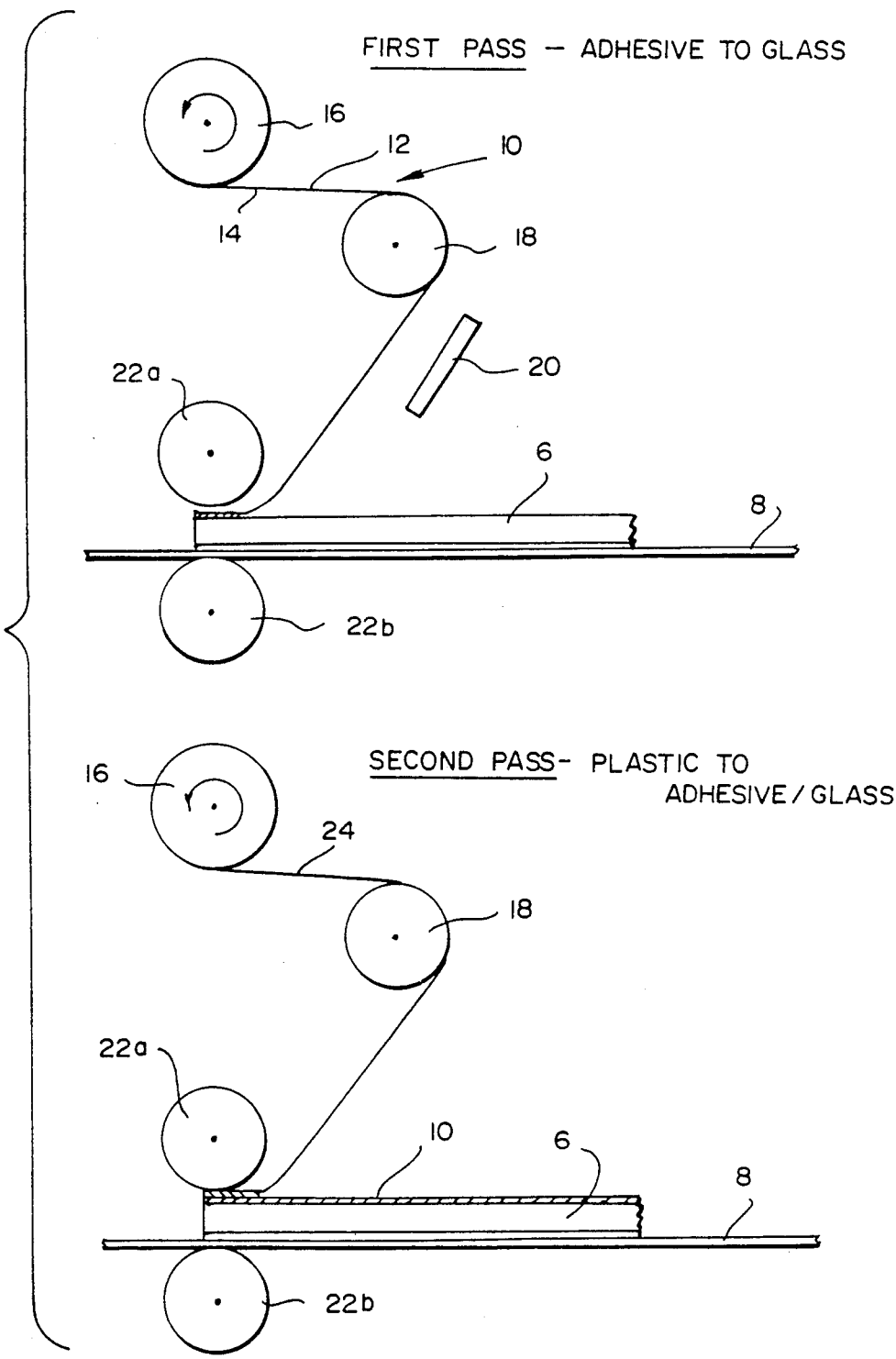
FIG. 1 which is a cross-section through the laminate.
FIG. 2 which is a highly schematic rendering of the production process.

Now it has been found that delamination resistant decorative safety glass for architectural purposes can be obtained through a very simple construction. Specifically, the laminate of the present invention will comprise a glass sheet and a plastic substrate provided with a decorative pattern on one surface of the substrate. Critical to the invention is the use of a special adhesive which is an acrylic substance. This substance is most easily utilized when in the form of a double-sided tape. A particularly useful adhesive of the aforementioned type is available from the 3M Company sold under the designation No. 9473. A liquid acrylic adhesive may also be useful.

Plastic substrates suitable for the present invention include polyvinyl chloride (PVC) and the engineering thermoplastics generically known as polycarbonate and polyethylene terephthalate (PET). Polycarbonate is available from the General Electric Company under the trademark Lexan. Polyethylene terephthalate is available from the DuPont Company under the trademark Mylar.

Arrangement of the three layers according to the invention will best be understood by reference to FIG. 1. Therein is illustrated a glass sheet 1 as the top layer of the laminate. On an opposite outer side of the laminate is a plastic substrate 3. Between the glass sheet and plastic substrate is an adhesive film 2 bonding the glass to the plastic substrate. Glass sheet 1 is the sole glass sheet of the laminate, i.e. a single glass laminate article.

Thickness of the glass sheet may range from about 1 inch to about 1/32 inch, preferably ½ to 1/16 inch, optimally about ¼ inch. The plastic substrate is applied in thicknesses ranging from about 100 mil to about 1 mil, preferably from 50 mil to 5 mil, optimally from 25 mil to 10 mil. The adhesive film is applied in thicknesses ranging from about 100 mil to about 1 mil, preferably from 20 mil to 2 mil, optimally from 10 mil to 5 mil.

The decorative pattern, preferably a marbleized pattern, can be applied to the plastic substrate by screen printing.

Screen printing involves forcing ink through a stencil. The stencil is a screen having porous portions that allow passage of ink to flow through onto the substrate reproducing a desired image. A squeegee normally formed from a flexible material such as urethane is used to force the ink through the screen.

Screen printing originally was known as silk screen printing but over the years other supporting materials for the stencil image have replaced silk. Most commercial screen printing now is accomplished with stainless steel mesh that has openings much finer than those possible with silk or other textiles, and stencils now are formed by photographic processes.

There are three types of screen printing presses in use today: manual, semi-automatic, and automatic. All of them contain the basic elements of a stencil or screen, a squeegee, and some type of back-up plate or fixture to hold the substrate in place.

The manual press consists of a table having a hinged frame which contains the printing screen. The substrate to be printed is held below on the back-up plate while ink is applied manually by means of a hand squeegee. Both frame and substrate are held stationary in this method.

Semi-automatic presses can be of the flat-bed type as just described or of the cylinder type. Simple, flat-bed type presses differ from the manual ones in that the squeegee is mechanized. In the cylinder press, the substrate is passed under the screen by means of a rotating cylinder which is usually vacuumized to hold the substrate in place. In the case of printing on cylindrical objects, the cylinder may be replaced by the substrate itself which will be rotated beneath the screen.

The automatic machine works on exactly the same principle as the semi-automatic machines, except that the former does not stop after a substrate has been printed. The squeegee moves continuously, or in the case of a stationary squeegee the screen moves continuously.

Within the context of the present invention, transfer means other than screen printing can be utilized, although less advantageously. Alternate transfer means include the techniques of letterpress, gravure (also called rotogravure), flexography, jet printing, pad transfer printing, and web printing. Brief descriptions of these alternate techniques may be found in *Modern Plastics Encyclopedia,* Volume 65, No. 11, mid-October 1989 issue, pages 382-383, herein incorporated by reference.

Screen printing operates through the transfer of one color at a time per pass through the system. Normally anywhere from 1 to 12 colors are employed in any particular design, thereby necessitating an equivalent number of screen plates.

The industry accepted method for transferring a design begins first with the printing of background colors, then the pattern (color within an image outline), and finally the outline itself.

FIG. 2 illustrates one method of producing the single glass laminates of the present invention. A sheet hardened, tempered or chemically hardened glass 6 is transported along a conveyor system 8. A double-sided adhesive tape 10 carrying an adhesive film 12 having a release paper 14 attached thereto is unwound from supply roll 16. The adhesive tape 10 is led around an idle roll 18 and thereafter heated in a vicinity of heater 20. Heated adhesive film 12 is then directed onto the transported glass sheet 6. A pair of nip rolls 22a and 22b firmly press against release paper 14 to firmly secure adhesive film 12 against glass sheet 6.

The same equipment that laminates adhesive to glass may be employed to laminate plastic substrate to the adhesive film/glass composite Thus, a roll of plastic substrate 24 may be charged onto supply roll 16 and unfurled around idle roll 18 and fed onto the release paper removed composite of adhesive film/glass. Nip rolls 22a and 22b again provide final pressure to compress together all three layers of the laminate.

For purposes of high speed and continuous operation, it may be desirable to avoid recycling the adhesive film/glass on the same equipment to achieve bonding of the plastic substrates. Consequently, it may be desirable to have downstream from the first lamination system separate supply roll, idle roll and nip roll equipment dedicated solely to laminating the plastic substrate onto the first two layers.

The following examples will more fully illustrate the invention and selected embodiments thereof.

EXAMPLE

A ¼ inch tempered Spandrel ® glass was fed through the conveyor-roll system illustrated in FIG. 2. Onto the glass was directed a double-face tape from the 3M Company identified as No. 9473 of 10 mil thickness. To ensure good adhesion, the combined adhesive film/glass was pressed between a pair of nip rolls. Release paper was then removed to expose a second side of the adhesive tape. A sheet of PVC obtained from Huls of America of 10 mil thickness was then applied to the exposed second adhesive side of the adhesive/glass combination. Prior to this lamination, the PVC substrate was provided with a white background and then screen printed with a black ink to achieve a marble effect.

The resultant single glass laminate was compressed by passing through a set of nip rolls. The product had a very satisfactory integrity and did not delaminate.

The foregoing drawing and description illustrates selected embodiments of the present invention. In light thereof, various modifications will be suggested to one skilled in the art, all of which are within the spirit and purview of this invention.

What is claimed is:

1. An architectural safety glass laminate comprising:
   (i) a glass sheet;
   (ii) an adhesive film which is an acrylic substance; and
   (iii) a plastic substrate provided with a decorative pattern on one surface thereof, said adhesive film positioned between and bonding said glass sheet to said surface of said plastic substrate.

2. The laminate of claim 1, wherein said laminate is manufactured with said adhesive film in the form of a double-sided tape.

3. The laminate of claim 1, wherein said pattern is supplied by ink through a process of screen printing.

4. The laminate of claim 1, wherein said pattern is a marble pattern.

5. The laminate of claim 1, wherein said plastic substrate is selected from the group consisting of polyvinyl chloride, polycarbonate and polyethylene terephthalate.

6. The laminate of claim 1, wherein said glass has a thickness ranging from about 1 inch to about 1/32 inch.

7. The laminate of claim 1, wherein said glass has a thickness ranging from about ½ inch to about 1/16 inch.

8. The laminate of claim 1, wherein said adhesive film has a thickness ranging from about 20 mil to about 2 mil.

9. The laminate of claim 1, wherein said plastic substrate has a thickness ranging from about 100 mill to about 1 mil.

10. The laminate of claim 1, wherein said plastic substrate has a thickness ranging from about 25 mil to about 10 mil.

* * * * *